June 25, 1940.　　　R. E. KLAGES　　　2,205,981

JOINT CONSTRUCTION

Filed Sept. 13, 1938

Inventor

Reynold E. Klages

By Braselton, Whitcomb & Davies

Attorney

Patented June 25, 1940

2,205,981

UNITED STATES PATENT OFFICE 2,205,981

JOINT CONSTRUCTION

Reynold E. Klages, Columbus, Ohio, assignor to The Columbus Auto Parts Company, Columbus, Ohio, a corporation of Ohio Application September 13, 1938, Serial No. 229,709

3 Claims. (Cl. 287—90)

This invention relates to joint constructions and more particularly to articulated joints adapted for tie rod and drag link connections used in steering mechanism of automotive vehicles and the like, and is an improvement upon my application Serial No. 177,559, wherein there is disclosed an arrangement of joint embodying a bearing seat member capable of limited universal movement with respect to the stud member of the joint construction.

This invention contemplates an improvement in ball joint constructions and embodies an annular bearing seat element having surfaces arranged to cooperate with both the stud member and the joint housing with means for resiliently retaining these parts in operative relationship and for taking up or compensating for wear of the parts.

The invention embraces the provision of a joint structure wherein a bearing seat member is interposed between a spherical portion of a stud member and the housing whereby the seat member is capable of limited universal movement with respect to the stud member, there being provided an element affording additional bearing surface for the joint structure and simultaneously providing the restricting means for limiting the amount of universal movement of the bearing seat member with respect to the stud member.

Another object of the invention is the provision of a joint structure of the ball and socket type embodying seating means so arranged that wear caused by relative movements of the elements of the joint structure is distributed over several surfaces whereby normal wear of the several elements is minimized.

Another object of the invention is the provision of a joint structure wherein the spherically shaped elements of the structure and the bearing seat arrangement are so formed as to minimize relative movement among the elements to equalize or distribute the wear over several surfaces and yet provide a structure wherein the over-all dimensions are substantially reduced.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which.

Figure 1:
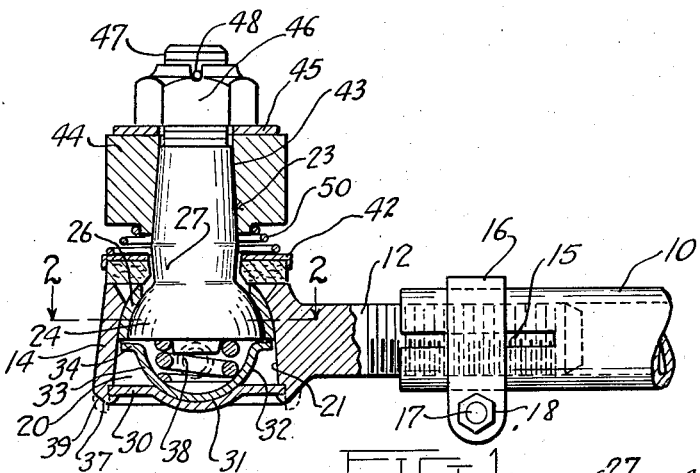
Figure 1 is a vertical sectional view illustrating the improved joint structure of my invention.
Figure 2:
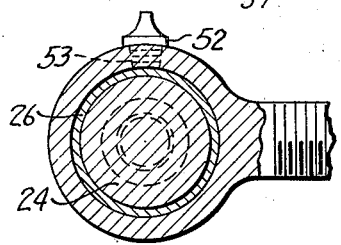
Figure 2 is a horizontal sectional view taken substantially on the line 2—2 of Figure 1.

While I have illustrated the joint structure of my invention as especially adapted and arranged for tie rod connection of an automotive vehicle, it is to be understood that I contemplate the use of the invention wherever the same may be found to have utility.

Referring to the drawing in detail, there is illustrated a form of joint construction of my invention in which numeral 10 designates a tubular tie rod interiorly threaded to receive a threaded tenon 12; the latter being formed as an integral extension of the joint housing 14. The end of the tie rod 10 is preferably split longitudinally as at 15 and is embraced by a clamp or collar 16 adapted to retain the tie rod in fixed relation or engagement with the tenon 12 by means of a bolt 17 and nut 18.

The longitudinal axis of the threaded tenon 12 in the embodiment illustrated is substantially at right angles to the axis of passage 20 formed in the housing 14. The lower interior wall of the housing is of slightly conical formation as at 21 terminating in a portion of spherical curvature 22.

A stud member 23 is provided with an enlarged segmental spherically shaped portion 24 which extends into the housing and is interposed between the curved surface 22 of the housing wall and the exterior curved surface of the enlarged portion 24 is a bearing means 26 which as illustrated is of annular formation and whose outer and inner surfaces have bearing engagement respectively with the curved housing wall and the exterior wall of the spherical portion 24 of the stud member. It is to be noted that the annular seat member 26 terminates short of the neck portion 27 of stud member 23 so that the stud member may have limited oscillatory movement independent of the seat member 26 as hereinafter explained. While the bearing means 26 are illustrated as an annular member, I contemplate the use of bearing means which may be a split ring or formed in two substantially similar semi-spherically shaped members.

The lower portion of the housing is closed by means of a closure plate 30 which has a central concave portion 31 whose inner surface is spherically shaped and has bearing engagement with the exterior spherically shaped surface 32 of an element 33, the surface 32 of element 33 being generated about the same center as the spherically shaped surface 24 of the stud member so that during oscillatory movements of the stud member and the element 33 they are caused to oscillate about a common center and together form substantially a ball-like configuration of the joint arrangement. The upper portion of the element 33 terminates in an equatorially arranged laterally extending flange 34 which is adjacent to but normally out of engagement with the lower portion of the segmental spherical portion 24 of the stud member and the lower edge of the bearing means 26. I have found that a clearance space of from .005 to .010 of an inch between the element 33 and the stud member and bearing seat has proven satisfactory in providing a lost motion engagement or connection between the element 33 and the stud and seat members.

Figure 9:
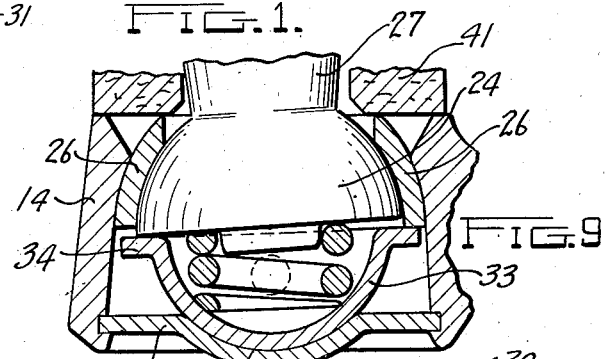
Figure 9 is an enlarged fragmentary detail sectional view illustrating the operation of the joint structure during tilting movement of one of the elements of the construction.
Figure 3:
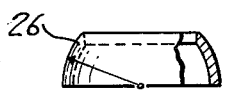
Figure 3 is an elevational view partially in section showing a bearing seat forming an element of the invention.
Figure 5:
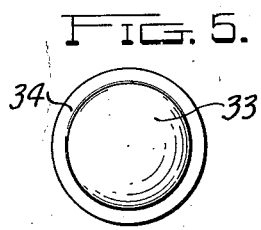
Figure 5 is an elevational view of an element of the joint structure.
Figure 7:
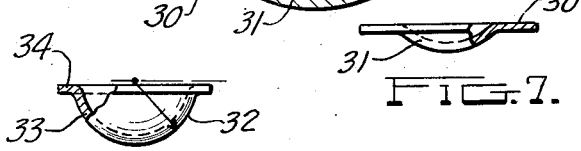
Figure 7 is an elevational view partially in section showing a closure plate.
Figure 4:
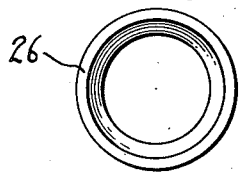
Figure 4 is a bottom plan view of bearing seat member illustrated in Figure 3.
Figure 6:
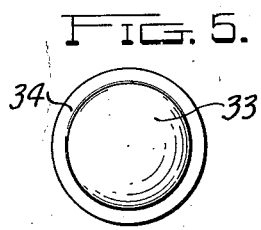
Figure 6 is a bottom plan view of the element shown in Figure 5.
Figure 8:
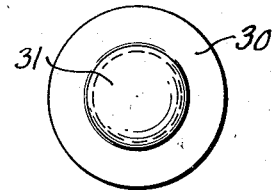
Figure 8 is a bottom plan view of the closure plate illustrated in Figure 7.

As will be seen from an examination of Figures 1 and 9 the element has a spherically shaped hollow interior in which there is positioned an expansive coil spring 37, there being preferably formed upon the stud member a comparatively short projection or tenon 38 which is surrounded by the upper convolution of the spring 37 to position the latter in the hollow interior portion of element 33. This spring serves to urge the stud member away from element 33 so that the stud member is retained in egagement with bearing seat member 26 and the latter in turn in engagement with the curved portion 22 of housing 14, the element 33 being urged into bearing engagement with the concave portion 31 of closure plate 30. The closure plate 30 is inserted in a recess formed in the end of the housing with the housing first formed as shown as at 39 in dotted lines in Figure 1. After the elements of the joint structure are inserted in the housing, the closure plate 30 is fitted into position and the annular flange or portion 39 of the housing is spun over or swaged into engagement with the closure plate as shown in full lines in Figure 1 to hold all of the several component elements of the joint arrangement in cooperative relationship. The annular seat member 26, element 33 and closure plate 30 are preferably formed of sheet metal whereby the cost of fabricating these elements is reduced to a minimum and if desired, they may be hardened to present bearing surfaces capable of long life.

Surrounding the stud member 23 adjacent the spherical portion 24 is a dust seal or gasket 41 formed of cork, felt or other suitable material, which is in engagement with the upper edge portion of the housing to prevent the ingress of dust and foreign matter into the joint structure as well as to retain lubricant therein. The gasket 41 is preferably reinforced by means of a metal disk 42. The stud member is provided with a tapered portion 43 to receive an arm 44 which is connected to one of the steering or dirigible wheels of the vehicle (not shown), the arm being held in place by means of a washer 45 and nut 46, the latter engageable with a threaded tenon 47 formed at the upper extremity of the stud member, the nut being locked or held in position by means of a cotter key 48. In order to maintain the sealing gasket 41 in engagement with the housing, there is interposed between the arm 44 and the metal disk 42 an expansive spiral spring 50 which serves at all times to exert a downwardly acting force upon the gasket 41.

I have provided means for lubricating the several bearing surfaces of the joint structure through the medium of a lubricating fitting 52 which is threaded into a laterally extending bore 53 in the housing wall, the injection of lubricant by suitable well known means (not shown) cooperating with the fitting 52. The lubricant may pass through all parts of the joint structure to the interior of the element 33 through the space between the flange 34 and the lower surface of the stud member, and through the various rotary and oscillatory movements of the joint arrangement the bearing surfaces may be thoroughly lubricated.

In the operation of the joint structure of my invention and particularly as exemplified in Figure 9, a preliminary oscillatory movement of the stud member 23 to the position shown in Figure 9 occurs independently of any movement of the element 33 because during the preliminary movement of stud member 23 there is no engagement between the element 33 and the stud member. The bearing seat member 26 being freely carried between the stud member and the housing may or may not move with the stud member depending upon the relative coefficients of friction between the stud member and the seat member, or between the seat member and the housing. However, further oscillation of the stud member causes the stud member to engage the equatorial flange 34 on the element 33 and cause an oscillation of the element 33 with the stud member 23. As the equatorial flange extends beyond the lateral dimension of the spherical portion 24 of the stud element, the flange will also engage the seat member 26 and cause it to be thereafter oscillated with the stud member, the spring 37 at all times serving to hold the parts in frictional cooperative relationship and to automatically compensate for any wear of the several bearing surfaces. By this arrangement the stud member is capable of limited movement independently of seat member 26 and the element 33, and the relative movement of the several surfaces during the operation of the structure is distributed so that total wear of all the parts is reduced to a minimum.

It is apparent that within the scope of the invention, modifications and different arrangements may be made other than is herein disclosed, and the present disclosure is illustrative merely, the invention comprehending all variations thereof.

What I claim is:

1. In combination, a joint housing having a passage therethrough, a portion of the wall of said passage being of spherical configuration; a stud member having an enlarged segmental spherical portion projecting into the passage in said housing; an annular bearing seat interposed between the spherical portion of said stud member and the spherical interior surface of said housing and movable on said spherical surface in the housing; a semi-spherically shaped element having a hollow interior and forming with the spherically shaped portion of said stud member a ball-like configuration, said semi-spherically shaped member having a laterally projecting equatorial flange normally spaced from said stud member to provide limited relative movement between said stud member and said semi-spherically shaped element; said equatorial flange being arranged to engage said stud member and said annular bearing seat during tilting movements of the stud member; a closure for one end of said housing having a bearing surface in engagement with the semi-spherically shaped element; and means resiliently separating said stud member and said semi-spherically shaped element.

2. In combination, a joint housing having a passage therethrough, a portion of the wall of said passage being of spherical configuration; a stud member having an enlarged segmental spherical portion projecting into the passage in said housing; an annular bearing seat interposed between the spherical portion of said stud member and the spherical interior surface of said housing; said annular bearing seat being movable on the spherical interior surface of the housing; a hollow semi-spherically shaped element cooperating with the spherically shaped portion of said stud member to form a ball-like configuration, said element having an equatorial laterally extending flange arranged adjacent to but spaced from said stud member and said annular bearing member to provide limited relative movement between said element and said stud and bearing members; a closure plate secured to said housing, said closure plate having a central concave bearing surface engageable with the exterior spherical surface of said element; and resilient means interposed between said stud member and said element for normally urging said stud member and said element in opposite directions.

3. In combination, a joint housing having a passage therethrough, a portion of the wall of said passage being of spherical configuration; a stud member having an enlarged segmental spherical portion projecting into the passage in said housing; an annular bearing seat interposed between the spherical portion of said stud member and the spherical interior surface in said housing and being movable on the spherical interior surface of the housing; a hollow semi-spherically shaped element cooperating with the spherically shaped portion of said stud member to form a ball-like configuration, said element having an equatorial laterally extending flange arranged adjacent to but spaced from said stud member and said annular bearing member to provide limited relative movement between said element and said stud and bearing members; a projection on said stud member; a coil spring interposed between said stud member and said element and surrounding said projection for maintaining said spring in proper relation in said element; and closure means for said housing having a concave portion engageable with the exterior spherically shaped surface of said element.

REYNOLD E. KLAGES.